June 6, 1944. A. M. LOUNGWAY 2,350,515
AUTOMATIC MACHINE
Filed June 24, 1942 12 Sheets-Sheet 1
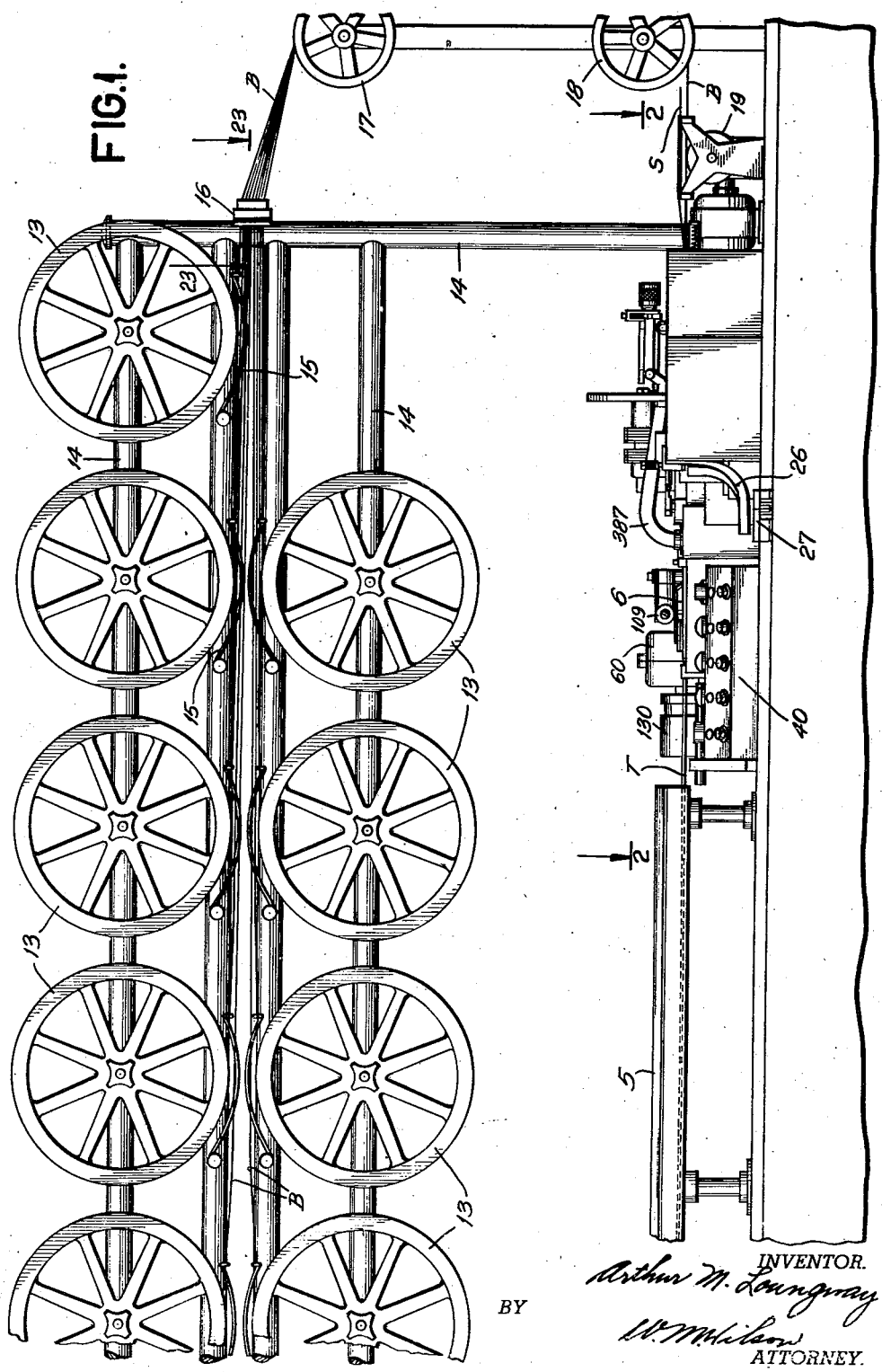
INVENTOR.
Arthur M. Loungway
BY
ATTORNEY.

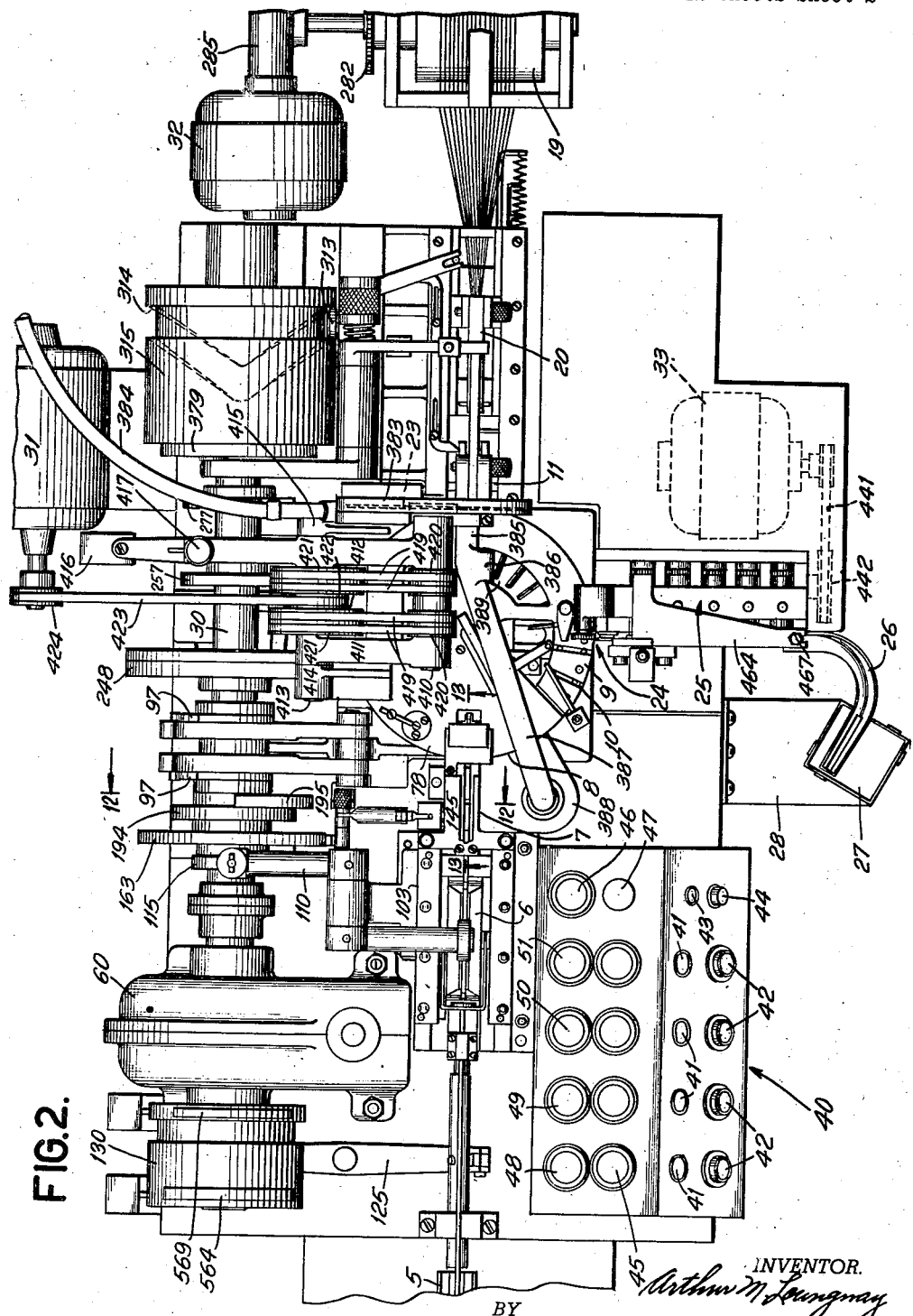

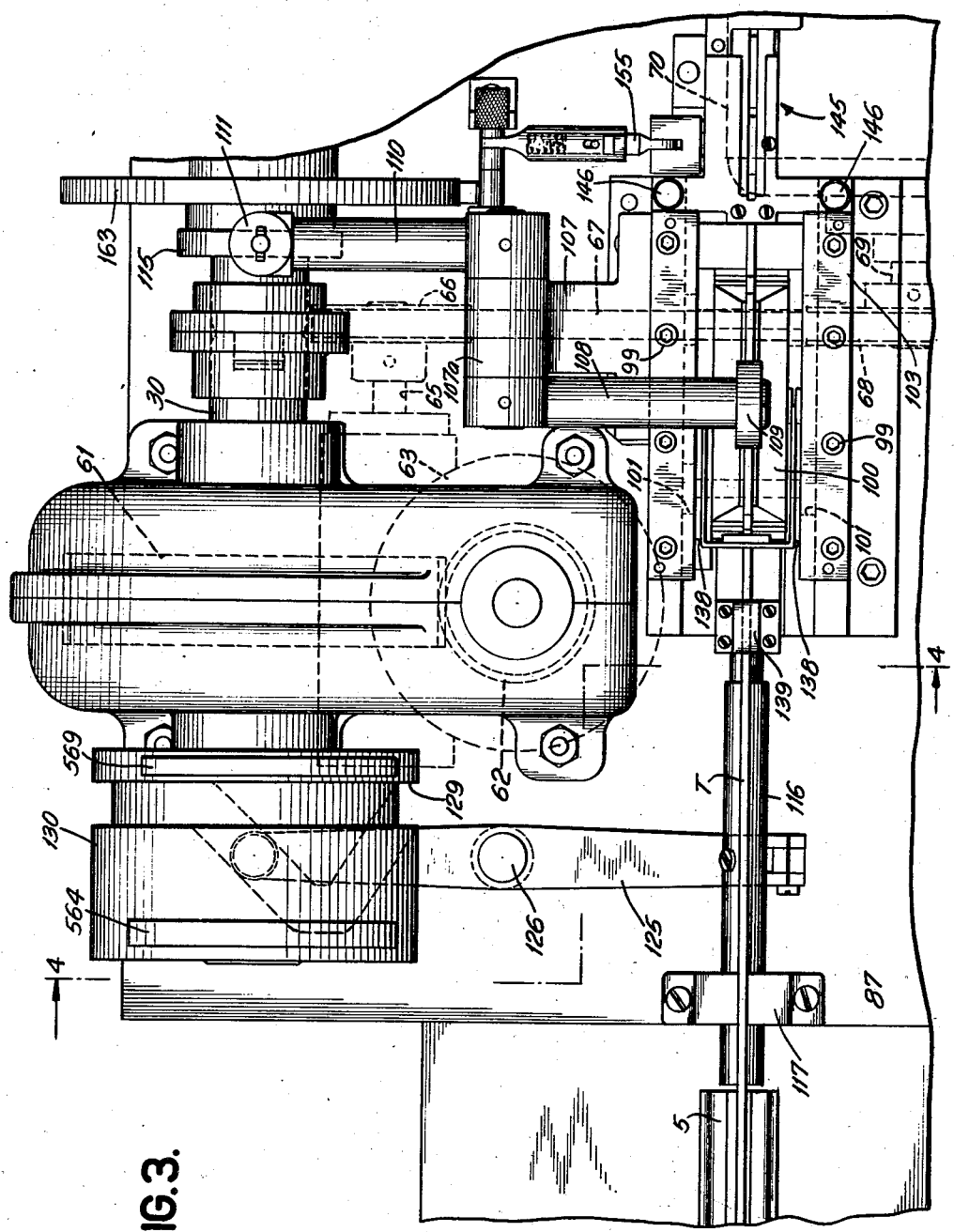

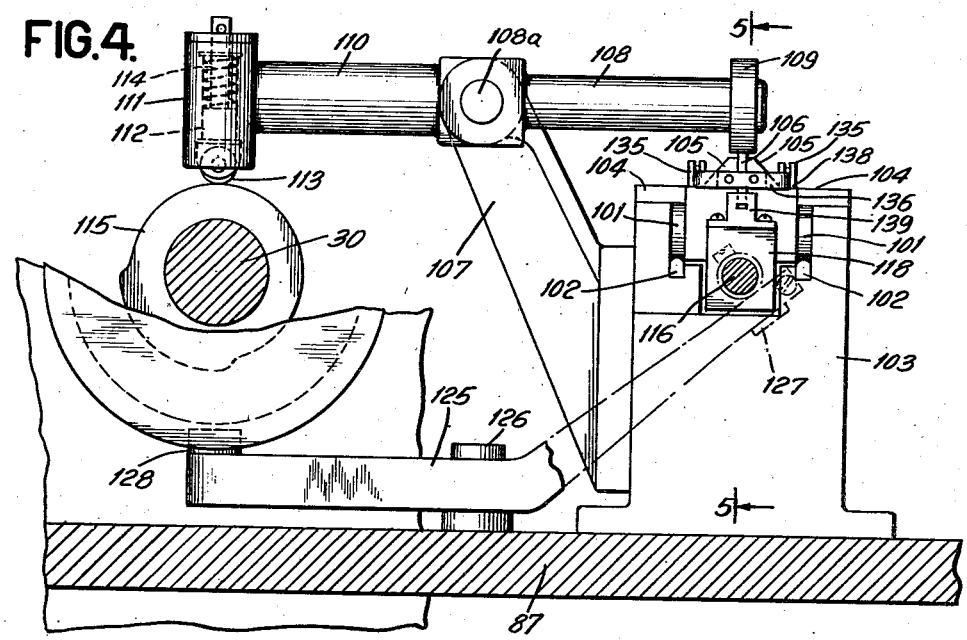
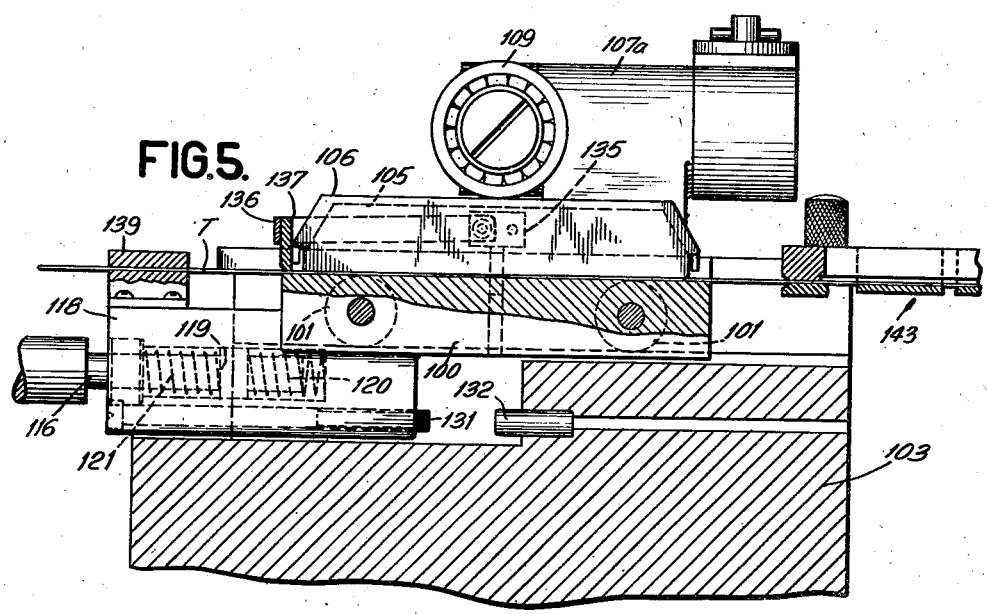

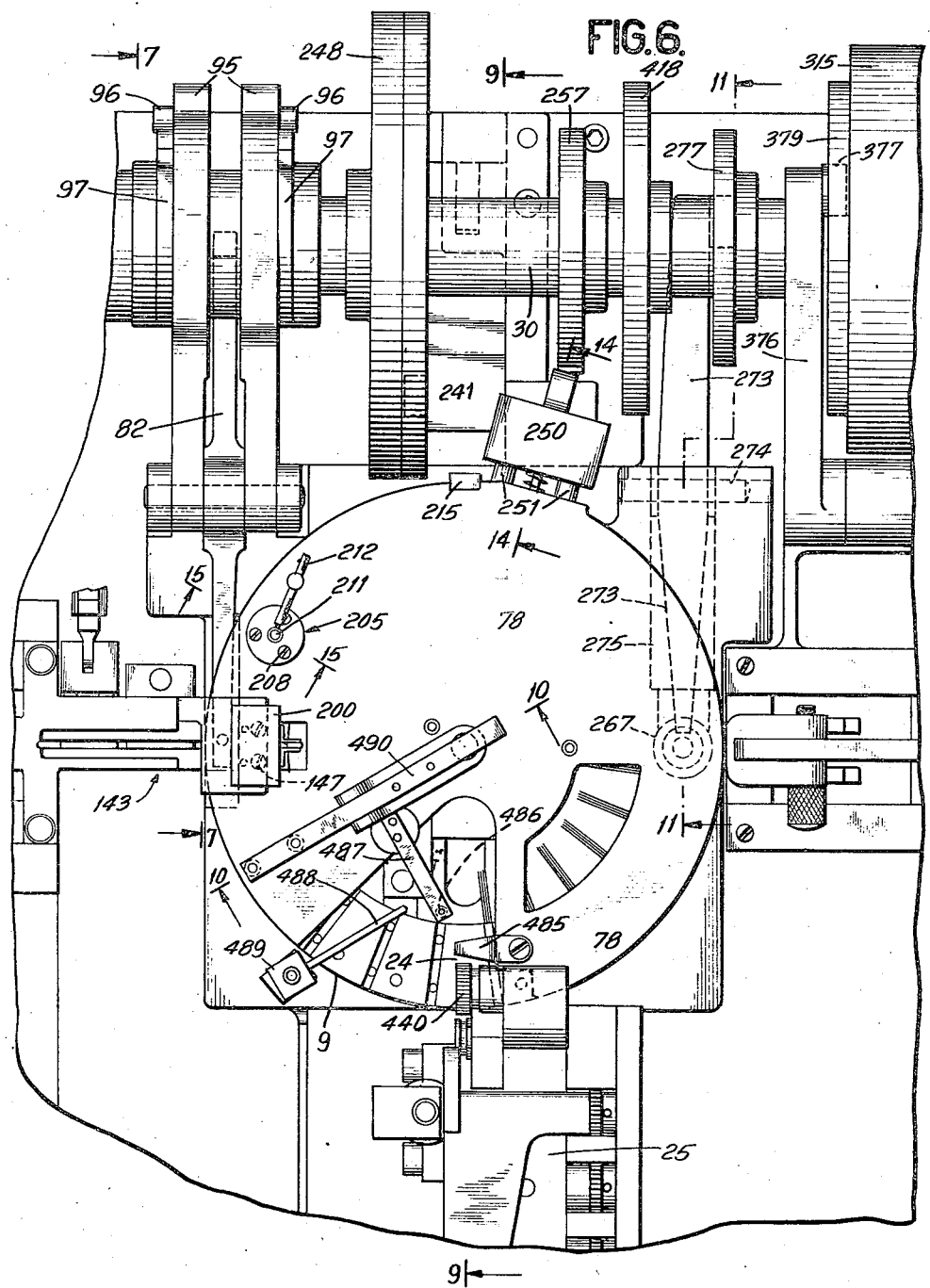

June 6, 1944.　　　A. M. LOUNGWAY　　　2,350,515
AUTOMATIC MACHINE
Filed June 24, 1942　　　12 Sheets-Sheet 6

INVENTOR.
Arthur M. Loungway
BY
W. M. Wilson
ATTORNEY.

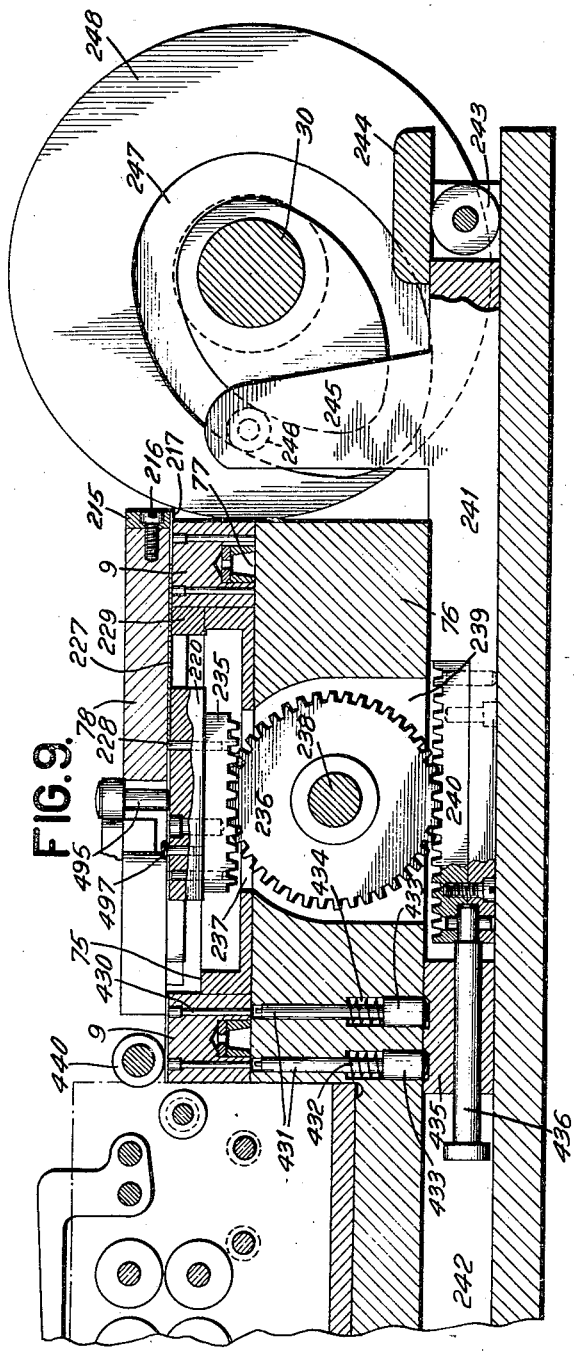
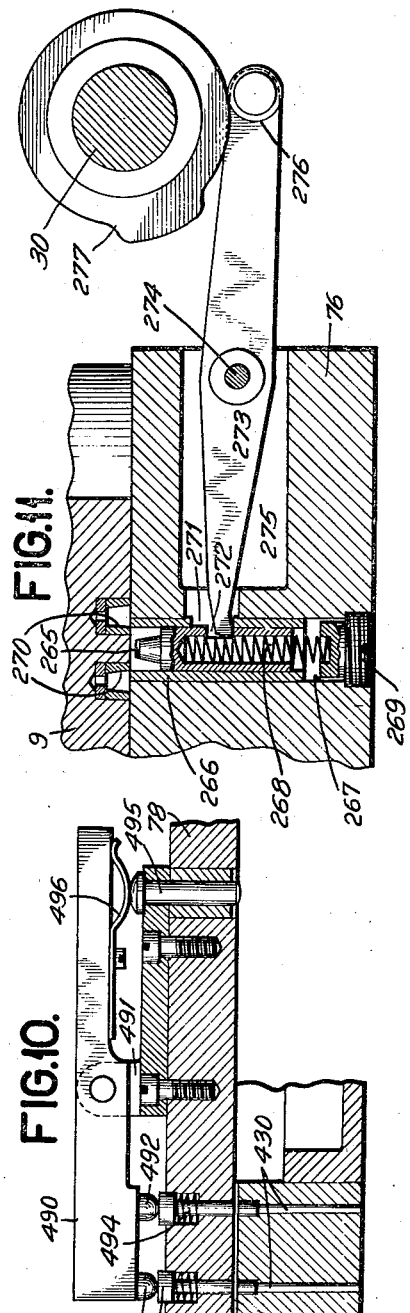

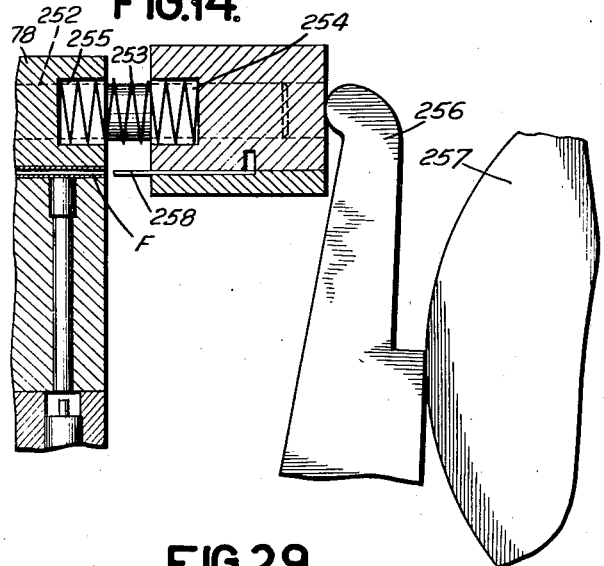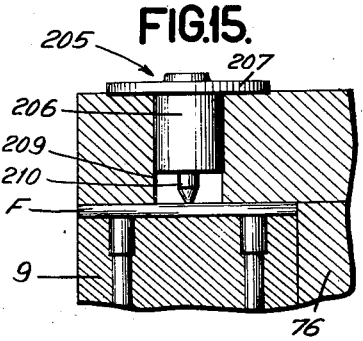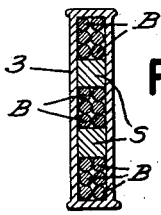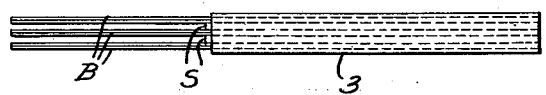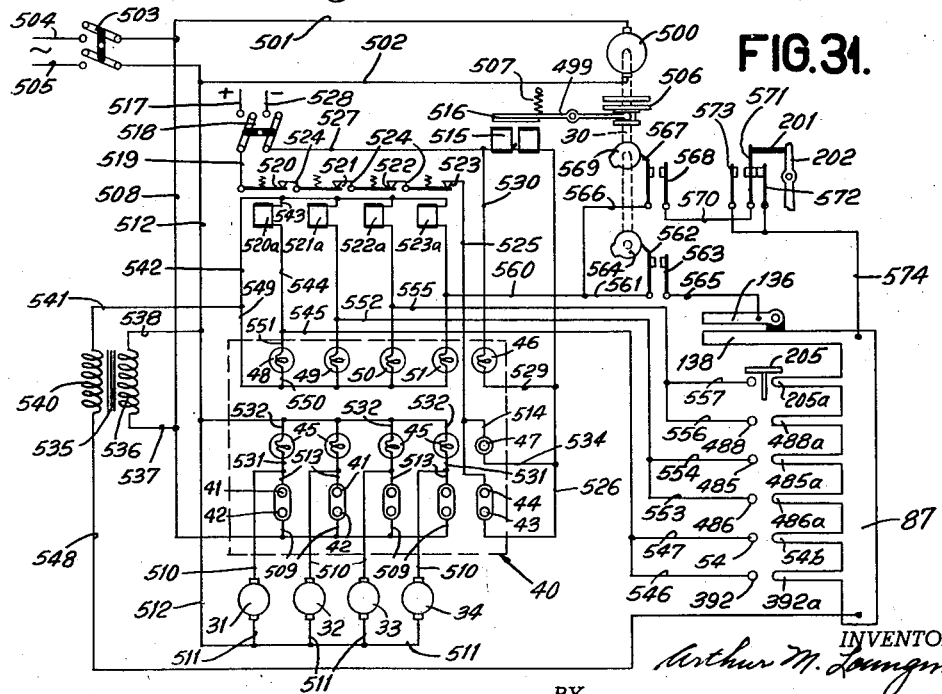

June 6, 1944.  A. M. LOUNGWAY  2,350,515
AUTOMATIC MACHINE
Filed June 24, 1942  12 Sheets-Sheet 10
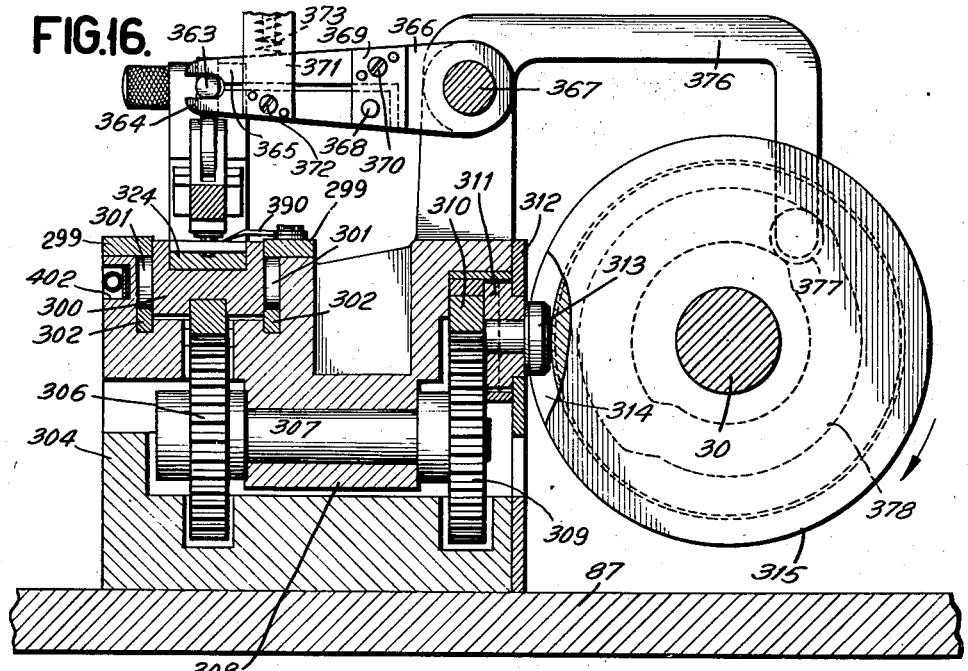
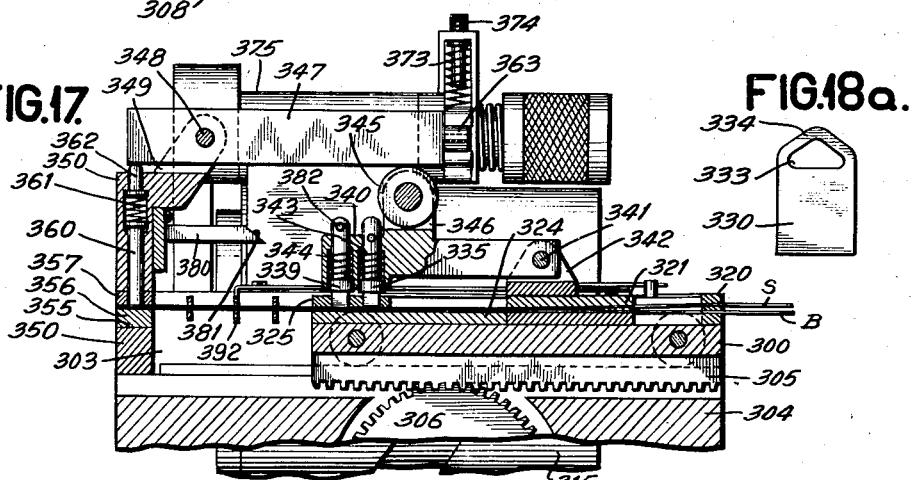
INVENTOR.
Arthur M. Loungway
BY
W. M. Wilson
ATTORNEY June 6, 1944. A. M. LOUNGWAY 2,350,515
AUTOMATIC MACHINE
Filed June 24, 1942 12 Sheets-Sheet 11
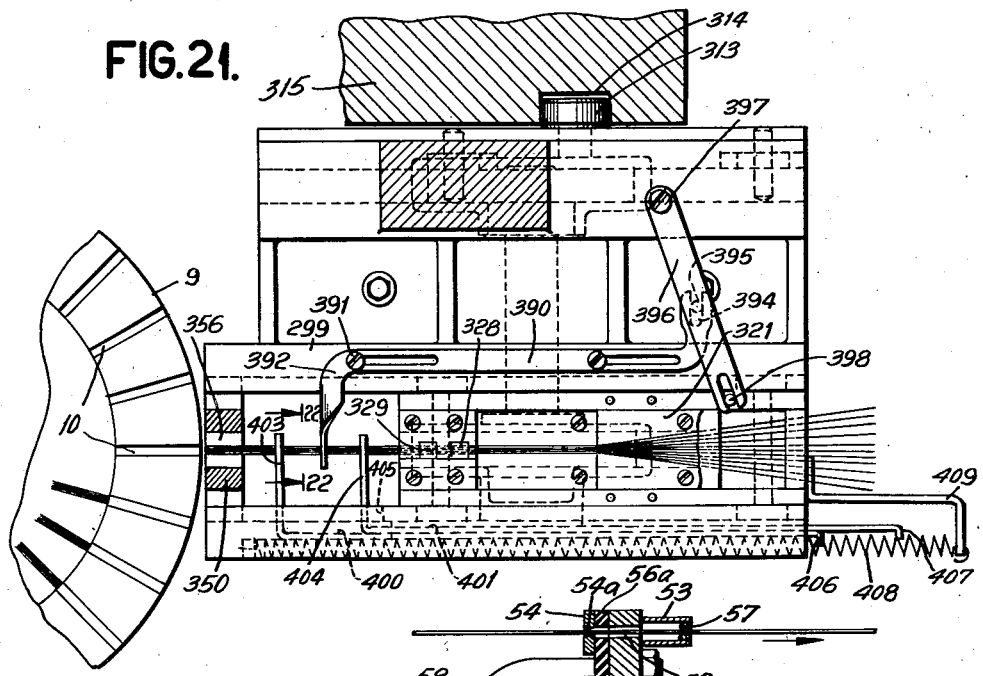
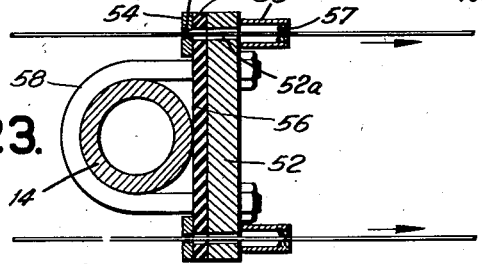
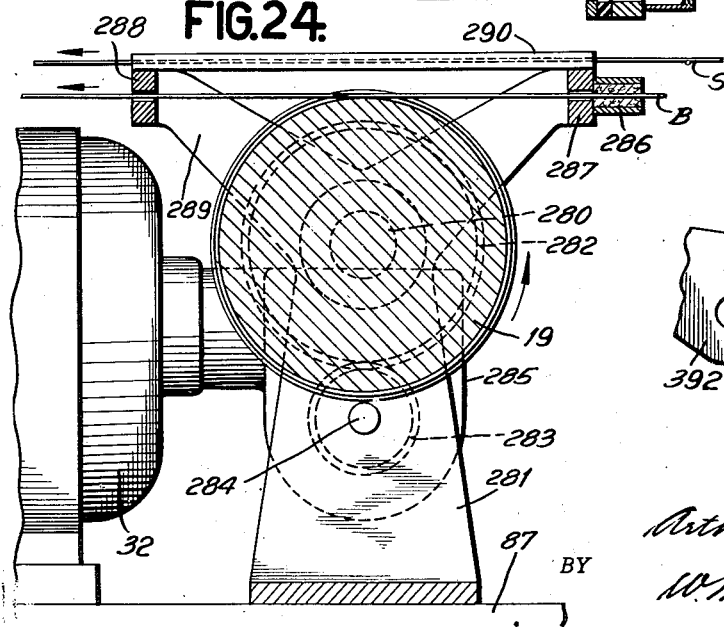
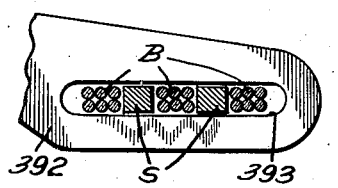

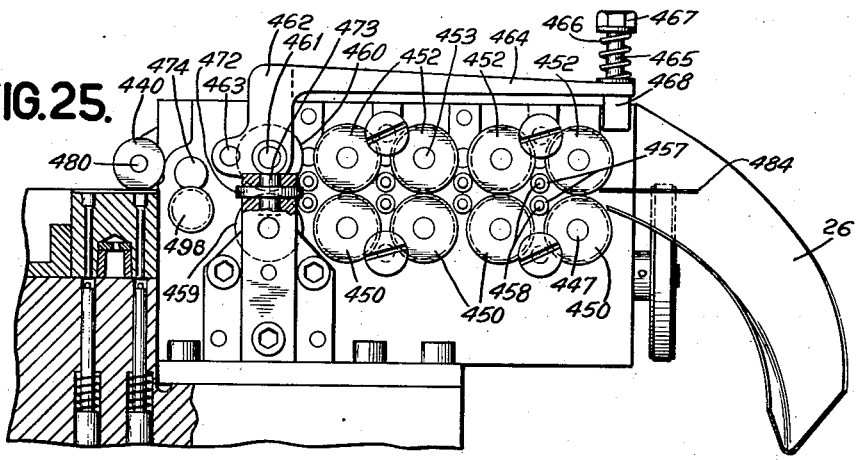
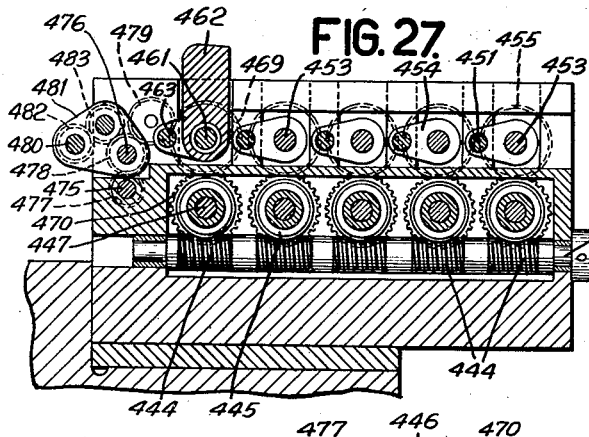
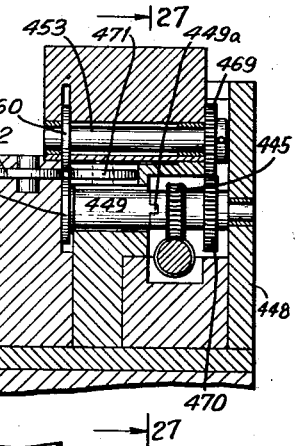
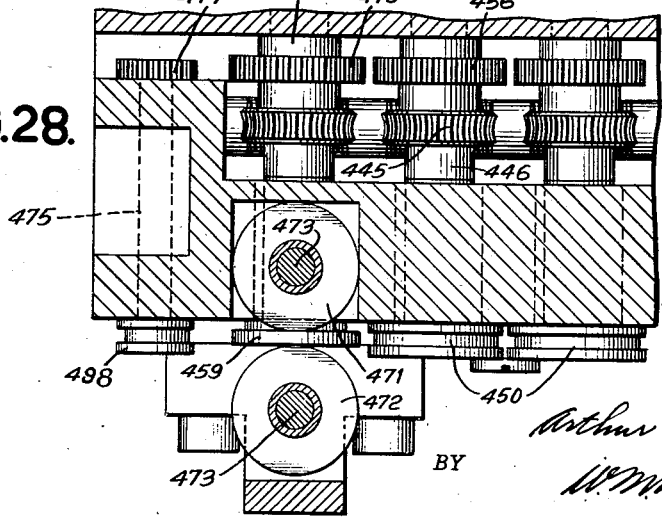

Patented June 6, 1944

2,350,515

UNITED STATES PATENT OFFICE 2,350,515

AUTOMATIC MACHINE

Arthur M. Loungway, Endicott, N. Y., assignor to International Business Machines Corporation, New York, N. Y., a corporation of New York Application June 24, 1942, Serial No. 448,328

11 Claims. (Cl. 300—2)

This invention relates to a machine for the automatic manufacture of brushes, for example contact brushes of the type used in electrically operated tabulating machines and other machines of similar character. These brushes are composed of one or more tufts of wire bound together at one end. Heretofore, as far as I am aware, the most expedient method of making such brushes has been by die casting a slug of metal upon the wires, to bind them into a unit.

A machine embodying my invention makes brushes having the tuft or tufts of wires set in a ferrule crimped upon them. The machine comprises a turret having an intermittently rotated index member, to which the ferrules are supplied at one station, while at another station a complement of wires is threaded into each ferrule. In a preferred form of the machine the ferrules, with their complements of wires, are ejected from the index member into a finishing mechanism, which crimps the ferrules upon the wires and shapes them to the desired finished form and size.

The machine preferably includes means for removing burrs and dirt from the ferrules before the wires are threaded into them and means for spreading them slightly at the end which is to receive the wires.

It is also preferably provided with means to indicate any failure of the various parts of the machine to perform correctly, any irregularities of the wires, or any accumulation of dirt on the index member, where it might interfere with the operation of the machine.

The principal object of the invention is to provide a machine of the character described which will produce brushes at a rapid rate and at lower cost than heretofore possible.

Another object is to provide a machine which will manufacture brushes of uniformly good quality, with a minimum of attention, beyond the maintenance of the supply of materials going into the manufacture.

Another object is to provide a machine which will indicate the source of any disturbance in its operation or defect of the wires, so that the operator can quickly correct the condition.

Another object is to provide a brush making machine which will feed exact lengths of small gage tube and wire into the machine, without injury to such materials.

Another object is to provide a brush making machine which will thread a bunch of wires into a ferrule of only slightly larger bore than the cross section of the bunch.

Another object is to provide a brush making machine which will thread into a ferrule a bunch of wires comprising several tufts of wires separated by spacers, the wires being fed through the ferrule far enough to project beyond it to a predetermined length, while the spacers are fed a shorter distance, so as to be substantially contained within the ferrule.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation of the machine, slightly broken away at its extremities.

Fig. 2 is a plan view of the principal parts of the machine, minus the wire supply reels and tube reservoir.

Fig. 3 is a plan view of a portion of the machine including the tube feeding mechanism and a part of the main drive mechanism.

Fig. 4 is a transverse vertical section on the line 4—4 of Fig. 3.

Fig. 5 is a vertical section on the line 5—5 of Fig. 4.

Fig. 6 is a plan view of the turret and appurtenant mechanisms at the various stations surrounding it.

Fig. 9 is a vertical section through the turret on the line 9—9 of Fig. 6.

Fig. 10 is a detail vertical section on the line 10—10 of Fig. 6 showing the restoring means for the brush ejectors.

Fig. 11 is a detail vertical sectional view on the line 11—11 of Fig. 6, showing the index member locking mechanism.

Fig. 14 is a detail vertical section on the line 14—14 of Fig. 6, showing the ferrule spreading mechanism.

Fig. 15 is a detail vertical section on the line 15—15 of Fig. 6, showing a detector switch for detecting the absence of a ferrule in a receptacle of the index member.

Fig. 16 is a vertical transverse section through the reciprocating wire feed mechanism.

Fig. 17 is a vertical longitudinal section through the same mechanism.

Fig. 18 is a detail vertical section of the brush wire clamping means of the same mechanism.

Fig. 18a is a side elevation of one of the wire clamps shown in Fig. 18.

Fig. 19 is a similar vertical section of the spacer wire clamping means.

Fig. 20 is a similar vertical section of the wire clamping means at the needle of the wire threading unit.

Fig. 21 is a sectional plan view of the reciprocating wire feeding mechanism.

Fig. 22 is a detail view of an electrical contact for detecting irregularities in the wire.

Fig. 23 is a horizontal sectional view of a portion of the wire supply creel, on the line 23—23 of Fig. 1, showing an electrical contact device for detecting kinks in the wire.

Fig. 24 is a vertical sectional view of the rotary wire feeding device.

Fig. 25 is a side elevational view of the ferrule sizing and straightening unit, showing a portion of the turret adjacent thereto in section.

Fig. 26 is a transverse sectional view through the sizing and straightening unit, at the sizing rolls.

Fig. 27 is a longitudinal sectional view through the sizing and straightening unit on the line 27—27 of Fig. 26, showing the driving gears.

Fig. 28 is a horizontal sectional view of a portion of the sizing and straightening unit along its median plane.

Fig. 29 is a side elevational view of the brush produced by the machine.

Fig. 30 is a transverse section on a larger scale, through the ferrule of the brush.

Fig. 31 is a wiring diagram of the machine.

Figure 7:
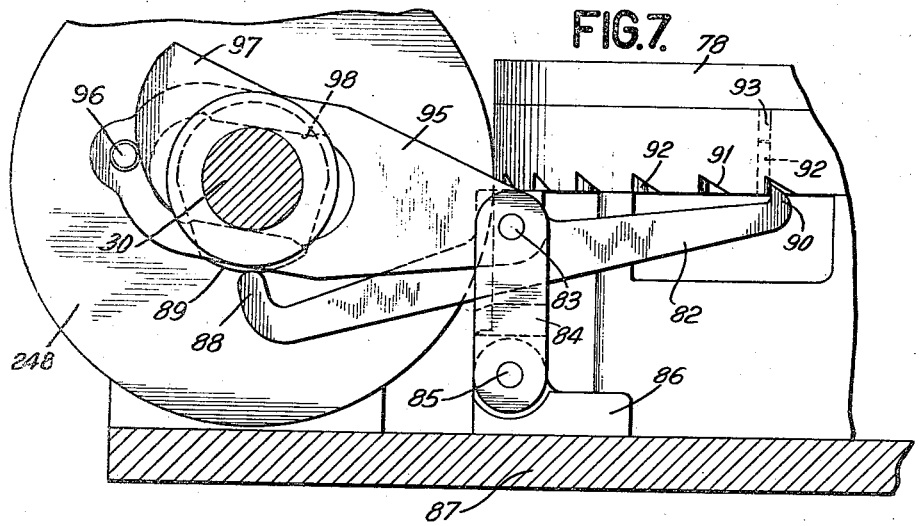
Fig. 7 is a vertical section on the line 7—7 of Fig. 6.

The machine shown in the drawings by way of example is designed for the manufacture of electrical contact brushes of the type shown in Figs. 29 and 30. These brushes comprise three tufts of brush wires B separated by spacer wires S and bound in a ferrule 3. The brushes leave the machine in the form shown in these figures and are ready for use after grinding off the tip of the tufts B to a certain angle. There are three tufts of brush wires B, each composed of six round wires, and two spacer wires S of rectangular cross section separating the tufts of brush wires. The ferrule is made from a length of tube of rectangular cross section having a bore only slightly larger than the bundle of wires and spacers. The ferrule is rolled to the I beam shape shown, in the finishing mechanism, and thereby crimped against the bundle of wires and spacers, tightly setting them in place.

The general arrangement of the machine can be seen from Figs. 1 and 2. The rectangular tubes from which the ferrules are cut are held in a rack 5 and fed toward the right by a reciprocating feeding unit 6, through a clamp and cut-off station 7, to a turret 8 comprising a rotary index ring 9. The ferrules cut off from the tubing are individually received in receptacles 10 formed by slots in the index ring, which is dogged one step in clockwise direction between each tube feed. The index ring advances step by step through certain stations to be described presently, and the ferrule arrives after a movement of 180° at a wire feeding station 11. The brush wires B are supplied from reels 13 mounted on a creel frame composed of horizontal and vertical pipes 14. The wires leaving the reels pass through guides 15 to a guide and electrical contact device 16 to be referred to later. They then run over pulleys 17 and 18 to a rotary feeding drum 19 and from there converge into a reciprocating wire feed unit 20. The spacer wires S are supplied from reels not shown in the drawings to the same reciprocating wire feed unit 20, passing above the brush wires B at the feeding drum 19. When the wires have been threaded through the ferrule and extend beyond it to the correct length, as shown in Fig. 29, the feed of the wire stops and the wires are cut off at the outer end of the ferrule by a cutting wheel 23. The index ring then turns further and the assembly of wires and ferrule reach the ejection station 24, where they are ejected and passed through a sizing and straightening unit 25. The finished brushes are dropped through a chute 26 into a packing box 27 on a support 28.

Some of the mechanisms of the machine are operated by a cam shaft 30 driven by a large motor, which does not appear in the structural views, and the other mechanisms by four fractional horsepower motors. Three of these smaller motors appear in Fig. 2, namely, a motor 31 driving the wire cut-off wheel 23, a motor 32 operating the wire feeding drum 19, and a motor 33 driving the brush sizing and straightening unit 25. The fourth fractional horsepower motor 34, shown in Fig. 12, drives the saw 35 of the tube cut-off station 7.

Another principal unit of the machine shown in Figs. 1 and 2 is the control box 40. This control box has four maintained-contact switches for the respective fractional horsepower motors, operated by starting buttons 41 and stop buttons 42. A fifth maintained contact switch for the main driving clutch is operated by a starting button 43 and stop button 44. There is associated with each of the switches for the fractional horsepower motors a signal light 45, which is on whenever the corresponding motor is in operation. A signal light 46 is on whenever the main clutch is engaged. A jog button 47 operates a switch to engage the main clutch as long as the button is held down by the operator. A series of four signal lights 48, 49, 50 and 51 serve to indicate the location of trouble when the machine is automatically stopped, in a manner to be described.

The cam shaft 30 is driven through a reduction gearing 61, 62, 63 (Fig. 3) housed in a casing 60. Power enters the reduction gearing through a shaft 65 upon which is pinned a pulley 66. A belt 67 is trained over this pulley and a driving pulley 68 pinned to the shaft 69 of a clutch housed in a casing 70. The structure of the clutch, which may be of standard design, is not shown. It is electromagnetically operated in a manner to be described with reference to the wiring diagram later on, and serves to clutch the main driving motor to the driving mechanism just described.

*The turret*

The construction of the turret is shown particularly in Figs. 2, 6, 7, 8 and 9. A circular block 75 is secured upon the upper face of a bed 76, leaving a bearing shoulder 77 upon which freely rests the index ring 9. A cover 78 removably secured to the block 75 by screws not shown fits over the index ring with small clearance, making the fourth side of the ferrule receptacles 10. A portion of the shoulder 77 is cut away beneath the index ring, as shown in Fig. 7 and in the space thus provided operates the index ring feed dog 82. This dog is rockably supported by a pin 83 upon a pair of rockers 84, pivoted by a pin 85 to a bearing 86 fixed to the frame 87. The left end of the dog 82 has an upwardly turned finger 88 bearing upon a cam 89 on the cam shaft 30, which throws the hook 90 of the dog into one after another of a series of notches 91 on the lower face of the index ring 9. In each of the notches the hook 90 bears upon a hardened pin 92 forced into a vertical bore 93 in the index ring at the forward side of the notch. A pair of links 95 are pivotally connected to the pin 83 at their right ends and are provided at their left ends with cam follower pins 96 bearing upon two identical cams 97 on the cam shaft 30. The links 95 are guided on the cam shaft by bearing surfaces 98 and are biased toward the right by a spring not shown in the drawings. The dog mechanism rotates the index ring at each stroke the distance between two pins 92, which is exactly the distance between two ferrule receptacles 10, as can be seen from Fig. 8.

*Tube feed.*—The tubes T are fed from the rack 5 to the clamp and cut-off station 7 by a reciprocating mechanism 6 (Figs. 1, 2, 3, 4, 5), comprising a car 100 provided with wheels 101 traveling upon rails 102 fixed in the cavity of a bolster block 103. The wheels are confined by plates 104 secured to the top of the bolster block by screws 99. The top of the car 100 is formed with two shoulders 105 between which is a slot of the same width as the longer cross sectional dimension of the tubing T. An elongated clamp bar 106 is freely held in the slot and rests upon the tubing T over its entire length. The clamp bar is operated from the cam shaft 30. In a bearing 107a of a supporting arm 107 is journaled a short shaft 108a, to one end of which is pinned the hub of an arm 108. The end of arm 108 carries a roller bearing 109, the outer race of which rests upon the clamp bar 106. A second arm 110 pinned by its hub to rock shaft 108a extends over cam shaft 30 and is formed at its end into a socket 111 holding a cam follower, comprising a shaft 112 on which is journaled a roller 113. The shaft 112 is pressed downward by a spring 114 so that its roller bears yieldingly upon a cam 115 of shaft 30.

The car 100 is reciprocated by cam shaft 30. A round bar 116 is slidably guided at its left end in a bearing 117 on the frame 87, and its right end extends into a hollow appendage 118 of the car 100. The bar 116 has fixed upon its right end a collar 119 held normally at a middle position in the cavity of the appendage by two springs 120 and 121. A lever 125 mounted by a pivot 126 on frame 87 is forked at one end to embrace a headed pin 127 fixed to the bar 116. The other end of the lever 125 has an upwardly directed boss 128 extending into a cam groove 129 of a barrel cam 130 of cam shaft 30. Rocking of the lever 125 by cam groove 129 moves car 100 to the right in Fig. 5, until a stop screw 131 strikes a dowel-pin 132; any further movement of the lever 125 being taken up by the spring 120. Prior to the beginning of the rightward movement of the car 100, the high part of cam 115 moves under roller 113 and the clamp 106 is pressed upon the tube T with a yielding pressure distributed over a considerable length of the tube, thus providing sufficient frictional contact to feed the tube while avoiding injury to its thin walls. The effective stroke of the clamp car, which determines the length of the ferrules cut off from the tube, is adjusted by means of the screw 131. Before the return movement of the car the roller 113 rides off the high part of cam 115, releasing the clamp 106 and allowing the car to slide along the tube, which is held by a stationary clamp at the clamp and cut-off station to be referred to presently.

There is provided on the car 100 a device for detecting the exhaustion of the tube feeding into the turret, so that the operator is warned to start a new tube into the machine. Outside of the shoulders 105 are two bearings 135 to which a bail 136 is pivotally attached. The left end of the bail, as seen in Fig. 5, has fixed to it a finger 137 composed of insulating material which rests upon the tube T. When the finger 137 is supported by a tube it holds the bail 136 slightly above the shoulders 138 of the car 100. When the tubing is exhausted and the finger 137 drops, the bail comes in contact with the shoulders 138. The bail is insulated from the bearing 135 and is connected by a wire (not shown) to a circuit to be described later. This circuit is closed when the bail 136 grounds against the shoulders 138. The tube is guided to the cam through a guide 139 mounted on the appendage 118.

Figure 12:
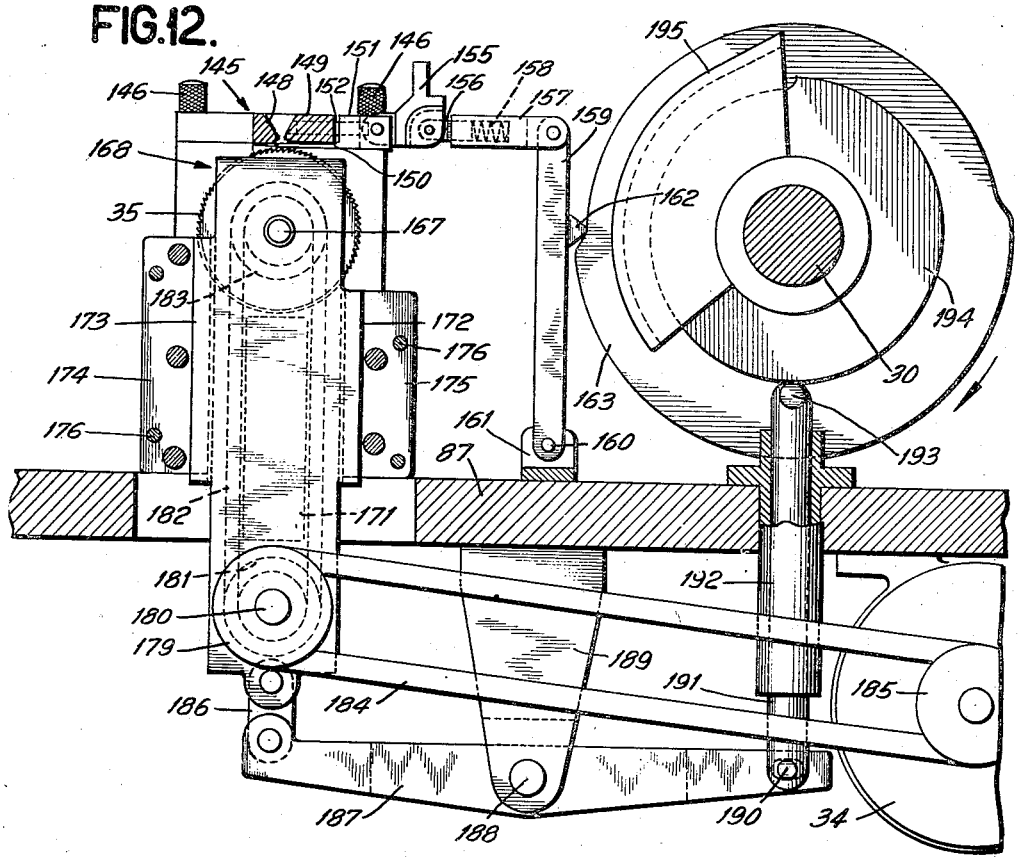
Fig. 12 is a vertical section on line 12—12 of Fig. 2 showing the tube cut-off mechanism.
Figure 13:
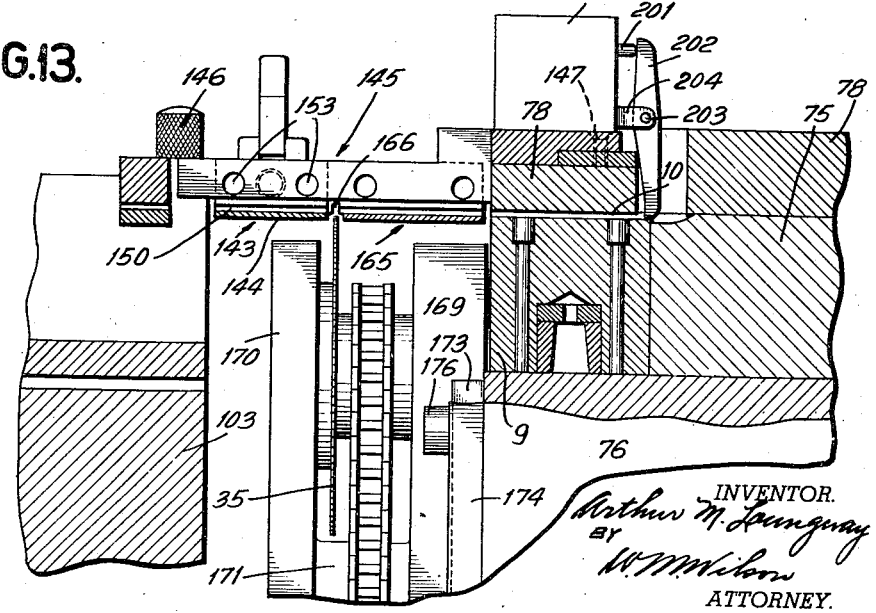
Fig. 13 is a vertical section on the line 13—13 of Fig. 2.

*Tube clamp and cut-off station.*—The tube feeding mechanism delivers the tube to the tube clamp and cut-off station 7 (Fig. 2), which comprises a tube guide 145 bridging over a gap between the bolster 103 and the turret 8 (see also Figs. 3, 12 and 13). The guide is fixed to the bolster 103 by knurled headed screws 146 and to the cover plate 78 of the turret by screws 147.

The first section 143 of the guide comprises a bottom plate 144 and two stationary shoulders 148, 149. Below the shoulder 149 is a horizontal slot in which slides a transversely movable clamp jaw 150, the left edge of which is opposed to a solid vertical face of the shoulder 148. The tube is fed between the jaw 150 and the vertical face of shoulder 148. The jaw 150 has an enlarged portion 151 in which are fixed two dowel pins 152 having a sliding fit in two holes 153 of the shoulder 149 and serving to guide the jaw 150. The jaw is articulated by a joint 155, a plunger 156, a socket 157, and a spring 158 in the socket bearing against plunger 156, to an actuating arm 159 pivoted at 160 to a bracket 161 on the frame 87. The arm 159 has a nose 162 which bears against a cam 163 of cam shaft 30.

The second section 165 of the guide 145 may be of similar construction to the section 143, even including a clamping jaw operated from the same cam as the jaw 150, but in the drawings the second clamp is omitted and this part of the guide serves merely to support and direct the tube. The two sections 143 and 165 are separated by a slot 166, into which the saw 35 moves to cut off the tube. The saw is fixed to an arbor 167 journaled in a vertically sliding frame 168 comprising two plates 169 and 170 joined in spaced relation by a web 171. The plate 169 has two bevel flanges 172 and 173 fitting in a guideway formed by two beveled bars 174 and 175 fixed by screws 176 to the bed 76. A shaft 180 journaled in the lower end of the plates 169 and 170 has pinned to it a sprocket wheel 181. A chain 182 is trained over this sprocket wheel and a sprocket wheel 183 fixed to the saw arbor 167. The shaft 180 also has pinned to it a pulley 179 driven by a belt 184 leading to a pulley 185 on the shaft of motor 34. The lower end of the frame 168 is articulated by a link 186 to one end of a lever 187 pivotally supported by a pin 188 upon a bracket 189 secured to the frame 87. The opposite end of lever 187 is connected by a pin 190 to a pitman 191 guided in a bearing 192 fixed to the frame 87.

The upper end of pitman 191 has fixed to it a pin 193 which bears against a cam 194 of shaft 30 by the weight of the saw unit supported by the opposite end of lever 187. It will be observed that as the cams 163 and 194 rotate in the direction of the arrow in Fig. 12, the clamp jaw 150 is first yieldingly pressed against the tube by the operating arm 159, then cam 194 gradually depresses the pitman 191, thereby raising the saw through the tube. The stroke of the saw is complete when the cam 194 has turned 180° from the position shown in Fig. 12. Just beyond this point an outside cam 195 is positioned in fixed relation to the cam 194, to engage the pin 193 of the pitman and retract it. The clamp jaw 150 is engaged at the end of the feed stroke of the car 100 and continues through the return stroke of the car, which takes place during the cut-off stroke of the saw.

The length of tube cut off by the saw is at first supported by the section 165 of the tube guide, in a preparatory position for feeding to the index ring 9. The length of the tube cut off is exactly equal to the distance between the right side of the saw and the left side of the index ring 9 and the length of the effective stroke of the tube feeding mechanism previously described is equal to the length of tube cut off, plus the width of the saw kerf. At the time the tube feed occurs the index ring stands with an empty receptacle 10 exactly aligned with the feeding path of the tube. Thus the feed of the tube presses the previously cut off length of the tube supported in the guide section 165, into the ready receptacle of the index ring, until its trailing end comes just flush with the outer surface of the index ring 9. Means are provided to stop the machine and give a signal if the tube is not fed exactly the required distance. There is shown in Figs. 6 and 13 a switch box 200 from which projects a switch operating button 201, to be actuated by a feeler lever 202 pivoted at 203 to a bracket 204 on the switch box. The lower end of the lever is biased by button 201 against the inner edge of the ring 9, as the ring turns from one index position to the next, and moves to the left into the empty tube receptacle 10 arriving at the tube receiving position. If the feed of the tube is just enough to move the feeler lever 202 out of the slot 10 so that the end of the new tube length comes flush with the inner surface of the index ring 9, the switch in box 200 is positioned to permit continued operation of the machine, as will be described later with reference to the wiring diagram. If the tube rocks the lever 202 too far, or not far enough, the machine will stop.

Two steps of the index ring from the tube feeding station just described, the newly inserted ferrule encounters a feeler contact 205 (Figs. 6 and 15), the object of which is to detect any receptacle which may have failed to receive a ferrule. The feeler contact 205 comprises a cylindrical box 206 having a flange 207 secured to the turret cover 78 by screws 208. The box 206 fits into a cylindrical hole 209 in the turret cover 78, leaving a space between the bottom of the box 206 and the top surface of the index ring 9. The top surfaces of the ferrule F and the index ring 9 are in the same plane. A feeler point 210 projects downward into this space and is biased against the top surface of the index ring and the ferrule surfaces in the same plane therewith, by a spring within the box 206. If any receptacle of the index ring should be empty, the feeler point 210 would drop into it and thereby close a switch in the box 206, establishing electrical contact between the ground and a terminal 211 connected by a wire 212 in a circuit controlling the main clutch, which will be described later.

*Broaching station.*—After 90° travel from the tube feeding station, the ferrule arrives at the broaching station, the position of which is indicated by the ferrule stop 215 in Fig. 6. The ferrule stop is fixed to the cover 78 by screws 216 (Fig. 9) and has at its lower edge a small aperture 217 which is located opposite the opening of the ferrule when the latter is in the broaching station. The aperture 217 is slightly smaller than the outer dimensions of the ferrule.

The broaching mechanism comprises a reciprocating slide 220 (see also Fig. 8) having flanges 221 which rest upon shoulders 222 formed at the sides of a cavity 223 in the block 75. The flanges 221 are covered by plates 224 secured to the block 75 by screws 225. At the top of the slide 220 is a slot 226 in which is firmly held a broach 227. A pin 228 stops the broach at its rear end. The block 75 has a guide lug 229 with a slotted guideway 230 for the broach 227. The cover 78 retains the broach in place.

The broach slide 220 is connected with its operating mechanism by a downwardly facing rack bar 235 thereon meshing with a pinion 236 which projects up through a slot 237 in the block 75. The pinion 236 is journaled upon a shaft 238 in a cavity 239 of the bolster block 76. At its lower side the pinion meshes with a rack bar 240 fixed to a pitman 241 guided in a slot 242 of the bolster block 76. At its right end the pitman 241 carries a roller 243 which travels between the floor of the slot 242 and a guide plate 244. The pitman 241 has an upwardly extending arm 245 carrying a roller 246 which travels in the groove 247 of a face cam 248 of cam shaft 30. When the slide 241 is moved to the left, the broach 227 is thrust to the right into the ferrule held by the stop 215. In Fig. 9 the mechanism is at the middle of its operative stroke. The broach removes any burrs on the ferrule bore and cleans out any dirt therein.

Figure 8:
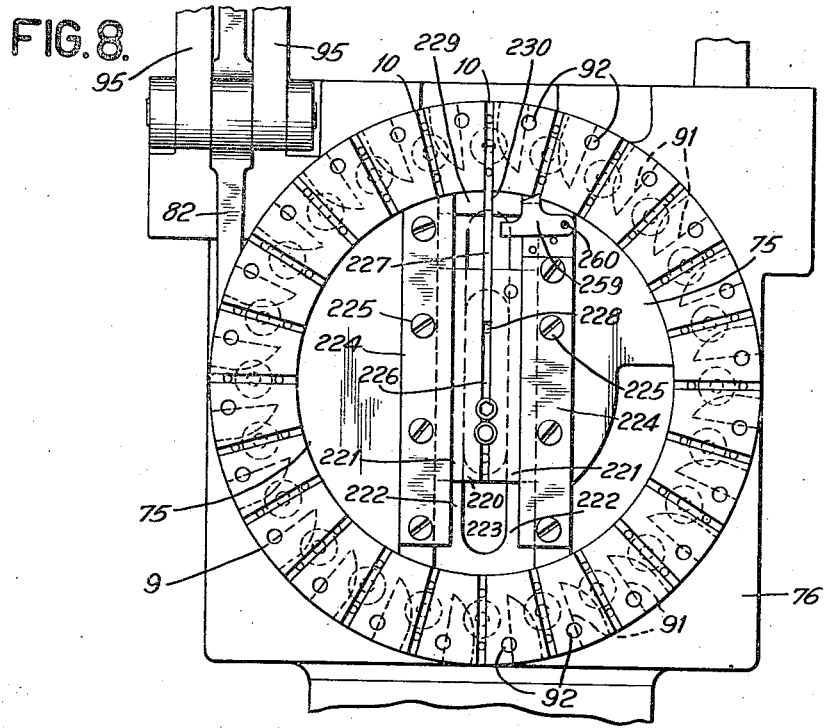
Fig. 8 is a plan view of the turret with the cover plate removed.

*Expanding tool.*—One index step beyond the broaching station the ferrule arrives at an expanding or bell mouthing station (Figs. 6, 8 and 14). A tool holder 250 has fixed in it two guide pins 251 slidably received in two parallel holes, one of which is indicated at 252 in Fig. 14. Between the guide pins 251 a spring 253 is socketed in a hole 254 of the tool holder and a hole 255 in the cover 78. The spring pushes the tool holder outward against an operating arm 256, which is pivoted to the bed of the turret at its lower end, by means which do not appear in the drawings. The arm 256 bears upon a cam 257 of the cam shaft 30. The tool 258 firmly fixed in the tool holder 250 is adapted to penetrate into the outer end of the bore of the ferrule F and is slightly tapered so as to spread the bore a little, in order to facilitate the threading of the wires into the ferrule later on. During the bell mouthing operation, the ferrule is supported at its inner end by a detent 259, which is pivoted at 260 to the block 75 and yieldingly urged by a spring (not shown) against the inner end of the ferrule. The detent 259 swings back out of the ferrule as the index ring steps forward.

*Index ring lock.*—Means may be provided to center and lock the index ring at each index position. Referring to Figs. 6 and 11, there is shown a centering pin 265 slidably mounted in a vertical bushing 266 in a hole 267 in the bed 76. The pin 265 is biased upward by a spring 268, the lower end of which rests upon a screw 269 screwed into the bed 76. The index ring 9 has centering sockets defined by tapered bushings 270 spaced at intervals corresponding to one step of movement of the index ring. Fig. 11 shows the index ring midway in its movement from one index position to the next. The bushing 226 and the pin 265 are apertured at 271 and 272 to admit the end of an actuating lever 273 pivoted upon a pin 274 in a cavity 275 of the bed 76. The right end of the lever 273 carries a roller 276 bearing upon a cam 277 of the cam shaft 30. The cam 277 rocks the lever 273 clockwise when each feed movement of the index ring has been completed to center and lock the ring in its index position.

Wire threading station

After 180° of travel from the tube feeding station, the ferrule arrives at the wire threading station, where in accordance with the construction of the brush shown in Figs. 29 and 30 it is to receive a complement of eighteen brush wires B and two spacer wires S, the brush wires B being supplied from reels 13 (Fig. 1) mounted on the creel frame consisting of the pipes 14. The drawings show nine reels and directly behind these, on the opposite side of the frame, are nine additional reels. The reels have associated with them wire guides 15 through which the wires pass to a guide and contact unit 16, where any kinks or irregularities of the wire are detected. As shown particularly in Fig. 23, this unit comprises a block 52 secured to the frame pipe 14 by a U-bolt 58. Upon the rear face of the block 52 is a sheet of insulation 56 to which two contact plates 54 are secured. There are registered holes 54a, 56a and 52a in the contact plate, insulation, and block. Upon the front face of the block are welded elongated sockets 53 containing apertured guide blocks 57, the holes of which are aligned with the holes 52a. The wires are guided by the guides 15 (Fig. 1) and 57, so that they normally pass through the holes 54a without making contact with the plate 54. The plate is connected in a circuit to be described later, whereby the machine is stopped and a signal given showing the cause of the interruption, if any kink or bend in one of the wires brings it into contact with the side of its hole 54a.

The brush wires B pass from the contact unit 16 over pulleys 17 and 18 to the wire feeding drum 19 (see also Figs. 2 and 24). This drum is journaled by its shaft 280 in a bearing bracket 281 mounted on the frame 87. The shaft 280 has fixed to it a gear 282 meshing with a gear 283 on the worm wheel shaft 284 of a reducing gear housed in a casing 285. The reducing gear is driven by motor 32. The eighteen wires from pulley 18 pass through holes in a guide 286 mounted on arm 287 of the bearing bracket 281 and, after taking a turn around the drum 19, pass out through holes in a guide 288 on an arm 289 of the bearing bracket 281. The drum 19 is rotated continuously by motor 32 in the direction of the arrow but the brush wires B are only fed by the drum when snubbed by a leftward movement of the reciprocating wire feeding mechanism 20 (Fig. 2) to which the wires pass from the drum 19. The spacer wires S, which come from two reels not shown in the drawings, run through a guide 290 supported on arms 287 and 289, without taking a turn around the feed drum 19.

The detail construction of the reciprocating wire feeding mechanism 20 can be seen in Figs. 16 to 22. A car 300 is carried by wheels 301 upon tracks 302 in a trough 303 of a bolster block 304 mounted on the frame 87. The wheels are retained by plates 299. The car has fixed to its bottom a rack bar 305 meshing with a gear 306 fixed to a shaft 307 journaled in a downward extension 308 of the car. A gear 309 fixed to the opposite end of shaft 307 meshes with a rack bar 310 fixed to a slide 311. The latter is slidably mounted in a slot of the bolster block 304 and held in place by a cover plate 312. The slide 311 has journaled upon it a roller 313 which engages in the groove 314 of a barrel cam 315 on cam shaft 30. The mechanism just described imparts reciprocating movement to the car 300 at the proper time.

The car 300 has a wire guide 320 at its right end, through which the wires B and S pass to a second wire guide 321. Both of these guides converge the wires until at the left end of the guide 321 the wires S and B have been brought close together and to the same level, where they are fed into grooves (Figs. 18 and 19) 322a, 322b, 322c and 323a and 323b, in a guide plate 324. It can be seen in Fig. 18 that the brush wires B are arranged in two layers in each of the grooves 322a, 322b, 322c and in three tiers in each groove. Each spacer wire S occupies its entire groove 323a, or 323b. At the left end of the plate 324 the grooves are covered by a plate 325. This plate has two square vertical holes 328 and 329 (Fig. 21). The rear hole 328 contains a set of clamping plates for the brush wires B (Fig. 18) while the front hole 329 contains clamping blocks for the spacer wires S (Fig. 19). There is a clamping plate 330 for each tier of brush wires B, the plates in each group being separated by thin spacers 331 and the groups being separated by wide spacer blocks 332. The clamping plates 330 have the form shown in Fig. 18a, a hole 333 being cut out near the top of the plate, to leave a slightly springy bail 334 adapted to yield under the pressure of a plunger 335 bearing upon the whole set of clamping plates. The purpose of this construction is to exert uniform clamping pressure on each vertical tier of brush wires, regardless of slight irregularities in these wires which might cause relative slippage if the entire group of six wires are clamped by a solid plate. As shown in Fig. 19, there is a single clamping plate 337 for each spacer wire S, the two plates 337 being positioned in the hole 329 by three spacer blocks 338. A plunger 339 bears upon the clamping plates 337. The two plungers 335 and 339 are slidably mounted in two sockets at the end of a lever 340 pivoted at 341 to a bracket 342 secured to the car 300. The plungers 335 and 339 are pressed downward by springs 343 and 344. A roller 345 is journaled in two ears 346 standing up from the lever 340. Upon this roller rests one end of a lever 347 pivoted at 348 to a pair of ears 349 on a stationary bridge plate 350 fixed to the front end of the bolster block 304. In a square aperture 355 in the bridge plate 350 is secured a needle block comprising a lower block 356 and an upper block 357. The lower block 356 has at its upper side a rectangular slot 356a (Fig. 20) of the correct size to pass the entire bundle of brush wires and spacer wires in contiguous relation. This slot is positioned in registration with the end of the bore of ferrule which stands at the wire feeding station.

As can be seen in Fig. 21, the needle block is spaced from the periphery of the index ring by a narrow gap, this gap being just wide enough for the passage of a thin cutting wheel. The upper needle block 357 has a vertical bore aligned with a similar bore in the bridge plate 350. In these bores is slidably guided a plunger 360 which rests at its lower end upon the bundle of wires. At the top of the plunger 360 there is an enlargement of the bore in the bridge plate, which contains a spring 361 interposed between the head of the plunger 360 and the foot of a second plunger 362 slidably guided in a continuation of the bore in the bridge block. The plunger 362 projects from the top of the bridge plate into contact with the left end of lever 347. The right end of the lever 347 is formed with a pin 363 embraced by two jaws 364, 365 of a lever 366 fixed upon a shaft 367. The jaw 364 is pivoted by a pin 368 to a plate 369 fixed by a screw 370 to the jaw 365. A bracket 371 fixed by a screw 372 to the jaw 364 is bent over at its upper end to enclose a spring 373, which bears against the jaw 365. A set screw 374 screwed into the top of the bracket 371 has a shoulder bearing against the top of the spring 373 and serves to adjust the compression of the spring. The shaft 367 of the lever 366 is journaled in a bearing 375 and has fixed to its opposite end an arm 376 carrying a roller 377 which engages in a cam groove 378 of a face cam 379 (Fig. 2) on the end of the barrel cam 315. The cam 379 rocks the lever 366 counterclockwise to press the plungers 335 and 339 against the clamp plates 330 and 337, with a yielding pressure determined by the springs 343 and 344. Clockwise movement of the lever 366 by cam 379 rocks the lever 347 in the opposite direction, to release the clamp plates 330 and 337 and to press the clamp plunger 360 against the bundle of wires in the needle block 356, with a yielding pressure determined by the springs 361 and 373. The pressure is applied to the clamp plates 330 and 337 before the car 300 starts its movement to the left to feed the wires through the needle block into the ferrule. The clamp plunger 360 is pressed down before the car 300 begins its return movement, in order to hold the wires while the wire guides of the car slip over them during the retrograde movement.

It has been mentioned that the feed of the brush wires is greater than the feed of the spacer wires, because the former extend considerably further beyond the inner end of the ferrule than the latter. This result is accomplished by a cam fork 380, fixed to the bridge plate 350 and having beveled cam ends 381 adapted to engage the two ends of a long pin 382 extending out from the top of the plunger 339. This engagement occurs when the spacer wires have been fed to the inner end of the ferrule. The plunger 339 is lifted from the clamp plates 337 and further movement of the car 300 to the left is without effect upon the spacer wires.

*Kink detector.*—Means are provided to detect kinks and irregularities of the wires as they pass from the car 300 to the needle block 356. A slotted bar 390 (Fig. 21) is slidably mounted by screws 391 upon the top of the inner plate 299. The left end 392 of the bar 390 is bent at right angles and given a 90° twist, to bring it to a vertical position across the path of the wires. The end 392 has a slot 393 through which the bunch of wires is threaded, the vertical width of the slot being slightly greater than the vertical dimension of the bunch of wires. The right end of the bar 390 is bent and forked at 394, to embrace a pin 395 located near the mid-point of a lever 396. The lever is pivoted at 397 to a part of the bolster block 304 and forked at its other end to engage a pin 398 on car 300. Thus the bar 390 is given a stroke about half that of the car. The bar 390 and lever 396 are insulated from the body of the machine by means not shown and connected by a wire also not shown in a circuit which will be described later.

Two guide bars 400 and 401 are slidably held in a groove 402 (Fig. 16) of the bolster block 304 and their rectangularly bent ends 403 and 404 extend through a slot 405 in the bolster block, across the path of the wires. The ends 403 and 404 are slotted similarly to the end 392 of the contact bar, but with smaller vertical clearance from the bunch of wires, so that contact with the wires is maintained and they are accurately guided. The right ends of the guide bars are bent out at 406 and 407 to engage different coils of a spring 408 housed in the groove 402. One end of the spring 408 is anchored to the bolster block 304, while the other end hooks into a bracket 409 fastened to the car 300. The guide bars 400 and 401 and the contact bar 390 are given proportional movements as the car travels to the left, which bring the ends 392, 403 and 404 closer together and nearer to the needle block. The movements are proportioned so that at all times the guide end 403 is about equidistant from the needle block and the contact end 392, while the guide end 404 is about equidistant from the end of the car and the contact end 392. The contact end never touches either of the guide ends. Thus the guide ends support the bunch of wires at all times so that they do not buckle against the contact end and only when there is a kink or bend of one or more of the wires does the bunch touch the side of the groove 393, to complete a circuit which stops the machine and gives a signal, as will be described presently.

*Wire cut-off.*—As soon as the wire feed is complete the cutting wheel 23, (Fig. 2) executes a stroke which carries it through the bundle of wires at the gap between the needle block 356 and the index ring. The cutting wheels 23 is mounted by its arbor 410 in a rocking frame comprising a short arm 411 and a long arm 412. These arms are mounted by a shaft 413 on bearing posts 414 and 415 on the turret cover 78. The long arm 412 extends to the rear beyond the cam shaft 30 where it carries a weight 416 normally holding the frame in position to support the cutting wheel 23 above the bunch of wires. A pin 417 extends through the arm 412 into contact with a cam 418 (Fig. 6) of cam shaft 30. At the proper time the cam rocks the frame and moves the cutting wheel through the bunch of wires. The arbor of the cutting wheel is driven through belts 419 trained over pulleys 420 on the wheel arbor and pulleys 421 on the shaft 413. Between the pulleys 421 is a pulley 422 over which is trained a belt 423 leading to the pulley 424 of motor 31.

There may be provided means, not shown in the drawings, for slightly crimping the ferrule against the bunch of wires at the wire threading station.

*Brush ejecting station.*—The ferrule with its complement of wires travels 90° with the index ring, to the ejecting station 24 (Figs. 2 and 6). The ejecting station is directly opposite the broaching station and the ejecting means are operated by the same slide 241 (Fig. 9) which operates the broach. At the radial plane of each ferrule receptacle of the index ring 9 there are two ejector rods 430 slidably mounted in vertical bores of the index ring. At the brush ejecting station, the ejector rods are positioned over two plungers 431 slidably guided in vertical bores of the bed 76. The plungers 431 are pressed downward by springs 432 interposed between their heads 433 and the upper end of enlarged portions 434 of the vertical bores of the bed. The heads 433 rest upon a cam block 435 guided in the slot 242 of the bed 76. The cam block 435 has a longitudinal bore through which passes a headed rod 436 fixed to the end of the slide 241. The cam block 435 does not follow the entire movement of the slide 241 but, being shorter than the distance between the head of the rod 436 and the end of the slide 241, is moved a short distance to the left as the slide 241 nears the left end of its movement, then a short distance to the right as the slide approaches the right end of its movement. The movement to the left of the cam block 435 thrusts the plungers 431 and the ejector rods 430 upward, raising the ferrule of the brush which is in the ejecting position against a knurled wheel 440. The wheel 440 is constantly rotated in clockwise direction, as seen in Fig. 9, by driving mechanism to be described presently, and thus frictionally drives the brush to the left.

Sizing and straightening unit

Upon being ejected from the index ring, the brush enters a sizing and straightening unit 25, shown particularly in Figs. 2, 6, and 25–28. The mechanism of this unit is driven by the motor 33 through a belt 441 trained over a pulley 442 pinned to the drive shaft 443. This drive shaft has five worm sections 444 spaced along it, with which mesh worm wheels 445 fixed to hubs 446 rotatably mounted on shafts 447 journaled in the bolster block 448 of the unit. On each of the five shafts 447 there is also journaled a hub 449 keyed by a tongue and groove connection 440a (Fig. 26) to the adjacent hub 446. The four hubs 449 starting from the right end of Fig. 27 have fixed to their forward ends grooved straightening wheels 450. Positioned above each lower straightening wheel 450 is an upper straightening wheel 452, the latter being fixed to shafts 453 journaled in rocking supports 454, pivotally mounted in the bolster block by pins 451. The rear ends of shafts 453 have fixed to them gears 455 meshing with gears 456 of the same size fixed to the hubs 446 of worm wheels 445. Between the vertical pairs of straightening wheels 450, 452 are pairs of rollers 457 journaled on stationary shafts 458. The relative positions of the straightening wheels 450, 452 and the pairs of rollers 457 is determined so that the brushes, on their passage through the series, are bent reversely several times, which straightens their ferrules.

On the shaft 447 at the left end of the series is fixed a lower sizing roller 459 and above this is an upper sizing roller 460. The latter is fixed to a shaft 461 journaled in a bearing 462 pivoted to the bolster block by a pin 463. The bearing 462 has an arm 464 extending to the right and forked at its end to embrace a bolt 465 secured to the bolster block. A spring 466 is interposed between the arm 464 and a nut 467 on the bolt 465. The spring normally holds the arm 464 against a stop 468. By turning the nut 467 the pressure exerted by the sizing rollers 459 and 460 upon the ferrules passing between them can be adjusted so as to finish the ferrules to the required size. The shaft 461 of the upper sizing roll has fixed to its rear end a gear 469 meshing with a gear 470 on the hub 446 of the worm wheel 445 at the left end of the series. At opposite sides of the sizing wheels 451, 460 are located two lateral sizing wheels 471 and 472. These are journaled upon short vertical shafts 473 and turn idly as the ferrules are driven between them by the vertical sizing rolls. In front of the sizing rolls is a flanged guide roll 498, which supports and guides the brushes in transit from the knurled wheel 440 to the sizing rolls. Above the guide roll 498 is a stationary boss 474, cut out at its lower side to receive the inner flange of the guide roll 498 and aiding in the lateral guiding of the brushes. The guide wheel 498 is fixed to a shaft 475 journaled in the bolster block, the shaft having fixed to its rear end a gear 477 meshing with a gear 478 journaled upon a shaft 476. The gear 478 meshes with an idler gear 479 driven by the gear 469. The knurled wheel 440 is fixed to a shaft 480 journaled in a bearing block 481 rockably supported upon shaft 476. The shaft 480 is driven by a gear 482 fixed to it, which meshes with an idler gear 483 driven by the gear 478. At the right end of the series of straightening wheels 450, 452 there is a stripper 484 which deflects the finished brushes into the chute 26.

If the ferrule, upon being ejected by the knurled wheel 440, should fail to pass over the guide roll 473 and should tilt up, the rear end of the brush would strike a contact 485 (Fig. 6) mounted, with interposed insulation, upon the turret cover 78. The contact 485 is connected in a circuit to stop the machine and give a signal, as will be described later. If the brush should fail to be ejected, the next step of the index ring would bring the brush wires against a contact 486 on an arm 487 fixed to the turret cover 78, with interposed insulation. The contact 486 is connected in a circuit similar to the one containing contact 485.

A contact finger 488 is mounted upon a post 489 on the bed 76, with interposed insulation. The contact finger 488 is positioned over the top surface of the index ring 9 with small clearance, so that the presence of any conductive dirt or metal particles will short circuit the contact finger to the index ring, thus completing a circuit for stopping the machine and giving a signal; as will be described with reference to the wiring diagram.

Means are provided to insure the return of the ejector rods 430 (Fig. 9) to their lower position. As shown in Figs. 6 and 10, an arm 490 is rockably supported upon a bearing bracket 491 secured to the turret cover 78. At its left end this arm carries two buttons 492 in suitable sockets which do not appear in the drawings. These buttons are pressed downward by springs which also do not appear and press against the tops of plungers 493 slidably mounted in vertical bores in the turret cover 78. The plungers 493 are held up by springs 494 so that their lower ends are normally flush with the bottom of the cover 78. The plungers 493 are positioned directly over the ejector rods 430 in the index position of the index ring and yieldingly press these rods down as the arm 490 is rocked counterclockwise. The rocking movement is imparted to the arm by a plunger 495 slidably guided in a bore of the bearing bracket 491. The upper end of the plunger 495 bears against a leaf spring 496 secured to the arm 490, while its lower end rests upon the broach slide 220 (Fig. 9). A headed pin 497 socketed in the broach slide moves under the plunger 495 as the slide 220 moves to the right, thus rocking the arm 490.

Vacuum cleaning means are provided as shown in Fig. 2 to keep the index ring clean and remove grindings and cutting chips. The cutting wheel 23 is enclosed by a hood 383 connected by a suction pipe 384 with a suction fan, not shown. A pipe 385 taps into the hood 383 to carry the suction to a nozzle 386 positioned over the brush wires, in an aperture 389 in the cover plate 78. A pipe 387 carries the suction to a manifold 388 which applies suction to the receptacles of the index ring, before they reach the tube feeding station, and also takes the chips from the tube saw.

*Wiring diagram and operation*

Referring now to the wiring diagram, Fig. 31, the main driving motor 500 is connected by wires 501 and 502 and a switch 503 to the line wires 504 and 505 of a source of alternating current. Between the motor 500 and cam shaft 30 is the main clutch 506, normally held disengaged by a spring 507 connected to its operating lever 499, so that the cam shaft 30 remains stationary. The auxiliary motors 31, 32, 33 and 34 are connected to the source of current 504, 505 through the following circuits: line wire 504, switch 503, wire 508, wires 509, push button switches 41, 42, wires 513, 510, motors 31, 32, 33, 34, wires 511, 512, switch 503 to line wire 505. Signal lights 45 go on as each auxiliary motor is turned on, being connected in parallel to their respective motors by wires 531, 532.

The machine is started by engaging the clutch 506, which sets the cam shaft 30 in rotation. The clutch is engaged by energizing the coils of an electromagnet 515 acting upon an armature 516 secured to the clutch lever 499. The electromagnet coils are energized by closing a switch 518 and depressing the starting button 43, through the following circuit: from the positive side 517 of a source of direct current, through switch 518, wire 519, switches 520, 521, 522, 523, interconnected by wires 524, wire 525, push button switch 43, 44, wire 526, electromagnet coils 515, wire 527, the other side of switch 518, to the negative side 528 of the source of current. If it is desired to jog the cam shaft ahead, the jog switch 47, connected in parallel to the push button switch 43 by wires 514 and 534, may be operated. A lamp 46 connected in parallel to the electromagnet coils 515 by wires 529 and 530 is illuminated whenever the clutch is engaged.

It has been previously mentioned that the machine is stopped and a signal given whenever any abnormal condition occurs, such as exhaustion of the tube supply, a kink in the wires, etc. The machine is stopped by breaking the circuit of the clutch magnet 515 at one of the switches 520—523. These switches are normally closed and are adapted to be opened by electromagnets 520a, 521a, 522a, 523a. The electromagnets are energized by a transformer 535, the primary coil 536 of which is connected across the alternating current supply lines 508, 512 by wires 537 and 538. The circuit of the electromagnet 520a controlling the switch 520 is closed by either one of the contact devices 54 or 392, for detecting irregularities of the brush wires, the circuits being as follows: from the secondary winding 540, of the transformer 535, wires 541, 542, 543, electromagnet 520a, wires 544, 545, thence either through wire 546, contact 392 and the brush wire to ground contact 392a; or through wire 547, contact 54 and the brush wire to ground contact 54b; thence through the machine frame 87 to wire 548 and back to the secondary winding 540. The energization of electromagnet 520a, through the closure of one of the circuits just described, opens the switch 520 and deenergizes the clutch magnet 515, the clutch being disengaged by its spring 507. Simultaneously with the excitation of electromagnet 520a to stop the machine, signal light 48 is illuminated to indicate the location of the trouble, this light being connected in parallel to relay coil 520a by wires 549, 550 and 551.

The electromagnet 521a is excited to open switch 521 whenever the brush fails to eject properly from the index ring and comes up against either contacts 485 or 486. The signal lamp 49 is illuminated at the same time, the circuits of the electromagnet and signal lamp being similar to the circuits for the electromagnet 520a and signal light 48 except that they pass through common wire 552 and either wire 553 or 554, through contact 486 or 485, through the brush to the ground contact 486a or 485a.

The electromagnet 522a is excited to open switch 522, and the signal lamp 50 is illuminated, whenever dirt is detected on the index ring by contact finger 488, or an empty ferrule receptacle is detected by switch 205. The circuits are again similar to those previously described, except that they pass through common wire 555, and either wire 556 or 557, and through contact 488 or switch 205, to ground contact 488a or 205a.

The electromagnet 523a is excited to open switch 523, and the signal lamp 51 is illuminated, whenever the tube supply is exhausted, as detected by bail switch 136, or whenever the feed of the tube to the index ring is irregular, as detected by feeler switch arm 202. The circuits from the transformer 535 through the electromagnet 323a and signal lamp 351 are similar to those previously described, while their contact with the ground is made through either of the following circuits: (1) common wire 560, wire 561, contact points 562 and 563, normally open but closed by a cam 564 on cam shaft 30 during a portion of each rotation of the cam shaft, wire 565, contact bail 136, now dropped to the grounded shoulder 138 of the tube feed car. (2) From common wire 560 through wire 566, across contact points 567 and 568, closed for a portion of each rotation of the cam shaft by a cam 569, wire 570, contact 571 operated by button 201 and feeler lever 202, to either one of grounded contacts 572 or 573, depending upon whether the tube is fed not far enough or too far, thence by wire 574 to the frame 87. The cam 569 closes the contacts 567, 568 just before the index ring feed dog 82 starts its operative stroke. If at this time the contact 573 is in engagement with either contact 572, because the tube has not been fed far enough, or with contact 573 because the tube has been fed too far, the circuit will be completed and the clutch magnet 515 will be deenergized to disengage the clutch before the index ring is started from the index position. The switch 200 is coordinated with switch 567, 568 operated by a cam on the cam shaft, in order to stop the index ring in the index position, where the trouble can be investigated before any damage is done by an improperly positioned ferrule, and for the further reason that the switch 200 is only held open by the ferrule during a fraction of one cycle. The bail switch 136 is coordinated with switch 562, 563 operated by the cam shaft, so that the index ring will stop in the index position, to allow correction of any irregularity of the position of the last inserted ferrule. The other control switches are not coordinated with switches on the cam shaft and thus stop the machine instantly whenever they detect an irregular condition. This is particularly important in the case of those contacts detecting irregularities of the wire, or dirt on the index ring, which might damage the machine if it did not stop instantly.

To summarize the operation of the machine as a whole: It is assumed that the turret is empty of stock, but that there is a supply of tubing in the rack 5 and reels of brush wire and spacer wire stand ready in the creels. The cam shaft 30 is in the position which holds the tube clamp 6 fully retracted and released. A tube is inserted under the contact bail 136 and through the tube clamp, up to the stationary clamp 145. The two main switches 503 and 518 are closed and the auxiliary motors 31, 32, 33 and 34 are started by their starter buttons 41. Their related lamps 45 are illuminated at the same time.

The circuit of the main clutch magnet 515 is partially set up by the closed condition of switches 520, 521, and 522; but the switch 523 is open because contact 571 is engaged with contact 572 and contacts 567, 568 are closed. It is necessary to manipulate switch lever 202 by hand to place contact 571 in neutral position, then to press starter button 43, in order to engage the main clutch 506. When the clutch is engaged in this way, the cam shaft 30 begins to rotate and the tube clamp 6 is first engaged and then moved toward the turret, feeding the tube for one stroke. Before this feed stroke, the stationary tube clamp 150 is retracted. At the end of the stroke, the clamp 150 is engaged and the saw 35 is raised to cut off the tip of the tube which can then be removed from the trough 165 by hand. The tube clamp 6 returns to the left while the tube is being cut off.

The next feed of the tube will position it so that the saw will cut off the correct length for a ferrule which will be held in the trough 165. On the third feed of the tube, the previously severed length will be pushed into the receptacle of the index ring 9 which stands in ready position. The ferrule fed into the index ring in this way will engage the switch lever 202 and from then on the feeding of the tube, the severing of the ferrules and their injection into the index ring will continue automatically, the index ring being stepped forward to bring an empty receptacle into ready position before each ferrule is pushed toward it.

As the index ring rotates, the switch 205 feels each passing receptacle to insure that it contains a ferrule. At the 90° position of the index ring, the broach 227 comes into play to clean the bore of the ferrule and remove any burrs thereon. One step further the expanding tool 258 is forced into the outer end of the ferrule bore, spreading it slightly.

As the first ferrule approaches the 180° position, the wires B and S are threaded through the guides 320, 321, through the grooves in the plate 324, through the slots of the guides 404, 392 and 403 and into the aperture of the needle block 356. When the first ferrule reaches the position of registry with the needle block, the wires, cut off by a preliminary pass of the cutting wheel 23, should be ready to be threaded into the ferrule as the wire feeding car 300 moves to the left. During this leftward movement, the plungers 335 and 339 clamp the wires in the grooves of block 324, as the roller 345 rolls under the lever 347, which is held down by the lever 366 at this time.

Before the car 300 completes its feed stroke, the plunger 389 will be lifted by the cam fork 380, terminating the feed of the spacer wires S as their ends reach the inner end of the ferrule. The feed of the brush wires B continues further, until they project for the proper length beyond the end of the ferrule. At the end of the feed stroke of the car 300, the lever 347 rocks counterclockwise, pressing the plunger 360 against the wires and releasing the plungers 339 and 335. As the car is retracted, the wires slip through the guides and clamps of the car. During the movements of the car in both directions, the contact member 392 scans the bunch of wires for kinks or bends. If any contact occurs against the member 392, the circuit of the relay 520a is closed and switch 520 opens, releasing the main clutch 506.

When the feed of the wires has been completed, the cutoff wheel 23 is rocked down through the bunch of wires, cutting them off at the end of the ferrule. The ferrule, containing its bunch of wires, advances step by step toward the ejecting station 24. Here it is raised by the rods 430 into contact with the knurled wheel 440 and fed thereby into the sizing and straightening mechanism. On passing through this mechanism, the ferrule is crimped upon the wires and reduced to correct size and is thereupon straightened on its passage through the straightening mechanism. The finished brush is discharged through the chute 26 into the box 27.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine for making brushes composed of a complement of wires bound in a ferrule, a turret comprising a rotary index member having a plurality of ferrule receptacles, means to rotate said index member by steps to successive index positions, ferrule supply means comprising means to feed a tube of ferrule stock intermittently, in the intervals between steps of rotation of said index member, to place a ferrule length of the tube in each receptacle of said index member upon arrival at one index position, means to sever the ferrule length from the tube after each feed of the latter, intermittently operating wire feeding means adapted to feed wires into each ferrule upon arrival at another index position, and means to crimp the ferrules upon the wires.

2. In a machine for making brushes composed of a bunch of wires bound in a ferrule, a turret comprising a rotary index member having a plurality of ferrule receptacles, means to rotate said index member by steps to successive index positions, intermittently operating ferrule supply means adapted to supply a ferrule to each receptacle of said index member upon arrival of the receptacle at one index position, intermittently operating wire feeding means adapted to feed wires into each ferrule upon arrival of the ferrule at another index position, a crimping and sizing mechanism located adjacent an ejecting index position of said index member at which the ferrules supplied with wires arrive after leaving said wire feeding index position, and means at said ejecting index position for ejecting the ferrules with their wires from said index member into said crimping and sizing mechanism.

3. In a machine for making brushes composed of a bunch of wires bound in a ferrule, a turret comprising a rotary index member having a plurality of ferrule receptacles, means to rotate said index member by steps to successive index positions, intermittently operating ferrule supply means adapted to supply a ferrule to each receptacle of said index member upon arrival of the receptacle at one index position, wire feeding means located adjacent a wire feeding index position of said index member, comprising a needle having an aperture similar in size and shape to the bores of the ferrules and positioned in exact registry with the bore of the ferrule in the wire feeding index position, a wire clamp guided for reciprocation axially of said needle aperture and the ferrule aligned therewith, means for guiding a bunch of wires to said wire clamp; and means acting in coordination to engage and release, and to reciprocate said wire clamp.

4. A machine as described in claim 3, wherein the bunch of wires guided to said wire clamp includes brush wires and spacer wires, said wire clamp including independent clamping devices acting upon said brush wires and said spacer wires, respectively; and means to terminate the engagement of the clamping device acting upon the spacer wires earlier in each stroke than the clamping device acting upon the brush wires, whereby the brush wires are fed further than the spacer wires.

5. A machine as described in claim 3, wherein said wire clamp comprises at least one groove having a cross section adapted to receive wires in a plurality of layers each containing a plurality of wires, said clamp including a plurality of clamping members movable independently of each other, each clamping member being adapted to engage a related wire in one of said layers, to clamp similarly positioned wires in the different layers by the individual related clamping members.

6. A machine as described in claim 3, wherein said wire clamp comprises at least one groove having a cross section adapted to receive wires in a plurality of layers each containing a plurality of wires, said clamp including a plurality of clamping members movable independently of each other, each clamping member being adapted to engage a related wire in one of said layers to clamp similarly positioned wires in the different layers by the individual related clamping members, and a single plunger acting upon a plurality of said clamping members, each of said clamping members including a compressible portion to take the thrust of said plunger.

7. A machine as described in claim 3, wherein a clamping plunger is guided for movement transversely into the aperture of said needle, and means to actuate said clamping plunger, alternately with respect to said reciprocating wire clamp, to hold the wires during the back stroke of the latter.

8. A machine as described in claim 3, wherein a creel is provided to hold a plurality of reels of wire, and a positively driven drum around which the wires pass on their way from said creel to said wire clamp, whereby the wires are drawn from said creel by said drum, upon being snubbed upon the drum by the forward stroke of said reciprocating clamp.

9. A machine as described in claim 3, wherein a series of three guides for the bunch of wires is arranged between said wire clamp and said needle, said guides having apertures to pass the bunch of wires, such that said wires maintain constant contact with the first and last guides but normally pass through the aperture of the intermediate guide without contact, means for imparting proportional movements to said guides in coordination with the reciprocation of said wire clamp, thereby keeping said guides at all times substantially equidistant from each other and from said wire clamp and said needle; electrically operated means for interrupting the rotation of said index member, and means for establishing a partial circuit connecting a source of current and said interrupting means to said proportionally movable guides, so that the circuit can be completed through the bunch of wires upon contact of a wire with said intermediate guide.

10. A machine as described in claim 3, wherein electrically operated means are provided to interrupt the rotation of said index member, including an electrical contact member located between said wire clamp and said needle, said contact member having an aperture through which the bunch of wires normally passes without contact, and means forming a partial circuit connecting a source of current and said interrupting means to said contact member and the bunch of wires, whereby contact of a wire with said contact member will complete the circuit and operate said interrupting means.

11. In a machine for making brushes composed of a bunch of wires bound in a ferrule; a turret comprising a bed and a ring shaped index member mounted on said bed so as to be circumferentially rotatable, said index member having a series of radial slots in one face thereof, each adapted to hold a single ferrule; a stationary plate covering the slotted face of said index ring; means to rotate said index ring by steps, to successive index positions; intermittently operating ferrule supply means adapted to supply a ferrule to each slot of said index member, upon arrival of the slot at one index position; intermittently operating wire feeding means adapted to feed wires into each ferrule, upon arrival of the ferrule at another index position; and means to crimp the ferrules upon the wires.

ARTHUR M. LOUNGWAY.